Patented Apr. 13, 1937

2,077,249

UNITED STATES PATENT OFFICE 2,077,249

BASICALLY SUBSTITUTED ACRIDINE COMPOUNDS

Fritz Mietzsch, Wuppertal-Elberfeld, and Hans Mauss, Wuppertal-Barmen, Germany, assignors to Winthrop Chemical Company, Inc., New York, N. Y., a corporation of New York No Drawing. Application June 3, 1935, Serial No. 24,774. In Germany June 6, 1934

12 Claims. (Cl. 260—36)

This invention relates to new basically substituted acridine compounds and is a further development of the invention described and claimed in our co-pending applications for Letters Patent Ser. No. 534,460, filed May 1, 1931, and Ser. No. 726,866, filed May 21, 1934. The new acridine compounds same as the acridine compounds described in the said co-pending applications are distinguished by a considerable efficacy on blood parasites.

In accordance with the present invention the new acridine compounds displaying the said antiparasitic properties particularly against malaria parasites are obtainable by the manufacture of acridine compounds of the general formula:

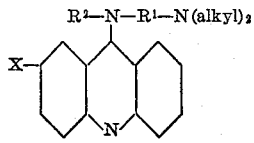

in which $R^1$ stands for an aliphatic radical, such as the methylene, ethylene, propylene, hydroxypropylene group and the like, $R^2$ stands for hydrogen or an alkyl group, such as methyl and ethyl, and X stands for a substituent of the group selected from alkyl groups and halogen atoms. The said alkyl groups and halogen atoms standing in the 2-position of the acridine molecule, which are of essential importance as to the anti-parasitic properties of the new products have proved equivalent in this respect.

In accordance with the present invention the said new acridine compounds are prepared by reacting upon such acridine substitution products as contain in the 9-position a replaceable substituent and in the 2-position a halogen atom or an alkyl group, with aliphatic polyamines containing a primary or secondary amino group. Replaceable substituents in the 9-position are, for instance, ether and ester like groups, such as halogen, aryloxy, alkoxy, aryl- and alkyl-mercapto groups. The reaction is preferably carried out in phenolic solution while heating, advantageously on the water bath. Also other organic substances, containing hydroxyl or sulfhydryl groups, have proved to be suitable solvents, for instance, ethyl alcohol, glycol, amyl alcohol, cresol, naphthol, thiophenol, and the like. The reaction temperature is advantageously at about 130° C. when using these substances as solvents. If necessary the reaction is performed in closed vessels. Presumably when using the 9-halogen derivatives as starting materials the reaction sometimes takes place with the formation of acridines, containing the radical of the solvent used in ether- or thio ether-like linkage in the 9-position, as intermediate products. The reaction is complete after heating for about one to several hours. The new base formed may be separated off by rendering the reaction mixture alkaline and taking up the base precipitated in an organic solvent, such as ether, methylene chloride or the like.

The aliphatic polyamine containing a primary or secondary amino group may contain substituents, for example the hydroxyl group and ether- or thioether-like linkages. Suitable amines are, for instance, diethylaminoethylmethylamine, dimethylaminoethylamine, 1-diethylamino-2-hydroxypropyl-3-ethylamine, 1-diethylamino-4-pentylamine, diethylaminoethylthio-propylamine, dimethylaminoethoxy-ethylamine, and the like.

The new acridine compounds are in the form of the free bases light yellow substances which are soluble in the usual organic solvents, for example, ether alcohol, acetone, benzene and methylene chloride. They may be dissolved in water in the form of their salts with acids, such as hydrochloric, hydrobromic, sulfuric, acetic, citric, tartaric, lactic acid and the like. These salts are obtained in the customary manner by neutralizing the free base with the acid. Two equivalents of the acid neutralize one mol. of the base. Of course, the free bases are soluble in dilute mineral acids and organic acid with the formation of the water-soluble salts.

The invention is further illustrated by the following examples without being restricted thereto:

*Example 1.*—24.8 grams of 2.9-dichloroacridine are melted on the water-bath with 100 grams of phenol and 16 grams of α-diethylamino-delta-aminopentane are added while stirring and heating for 1 hour to 90–100° C. The reaction mixture is introduced into 1000 cc. of 2-normal caustic soda solution and the 2-chloro-9-(α-diethylamino-delta-pentylamino)-acridine formed is taken up in ether. The ethereal solution is extracted with 10% acetic acid and the acetic acid solution is separated and rendered alkaline by means of potassium carbonate. The base which has separated is again taken up in ether. On the addition of an ethereal solution of hydrogen chloride the dihydrochloride separates as a yellow powder which is readily soluble in water with a yellowish-green fluorescence. After crystallization from alcohol-ether it decomposes at 160–165° C.

The 2.9-dichloroacridine (forming almost colorless needles when crystallized from benzene, melting at 146–147° C.) is obtained from the 4'-chlorodiphenylamino-6-carboxylic acid (compare Ullmann and Tedesco, Annalen der Chemie, 355, page 339) by subjecting it to ring closure and chlorination.

When using in the above example instead of α-diethylamino-delta-aminopentane 14.6 grams of α-diethylamino-β-hydroxy-γ-aminopropane the dihydrochloride of the 2-chloro-9-(α-diethylamino-β-hydroxypropylamino)-acridine is obtained. After recrystallization from alcohol crystals are obtained which on heating decompose at 236–237° C.

When using 11.6 grams of α-diethylamino-β-aminoethane the 2-chloro-9-(diethylaminoethylamino)-acridine separates in the form of a solid yellow powder upon the addition of alkali to the acetic acid solution referred to above. The dihydrochloride of the base is obtained by dissolving the base in acetone and adding concentrated hydrochloric acid. On heating it decomposes at 250–252° C.

The dihydrochlorides of 2-chloro-9-(α-dimethylamino-γ-propylamino)-acridine, 2-chloro-9-(α-diethylamino-delta-butylamino)-acridine and the 2-chloro-9-(α-diallylamino-β-ethyl-amino)-acridine are obtained in the form of yellow powders in an analogous manner when using α-dimethylamino-γ-aminopropane, α-diethylamino-delta-aminobutane and α-diallylamino-β-aminoethane, respectively as the amine component in the above reaction. When using α-diethylaminoethylthio-γ-aminopropane (boiling at 135–136° C. under 12 mm. pressure) the 2-chloro-9-(α-diethylaminoethylthio-γ-proplyamino)-acridine, and when using α-dimethylaminoethoxy-β-aminoethane (boiling at 88–92° C. under 11 mm. pressure) the 2-chloro-9-(α-dimethylaminoethoxy-β-ethylamino)-acridine are obtained. They form with hydrochloric acid water-soluble dihydrochlorides.

Water-soluble salts of the above mentioned acridine compounds are also obtained when preparing for instance the dihydrobromides, the nitrates and the sulfates.

*Example 2.*—24.8 grams of 2.9-dichloroacridine are treated with 16 grams of α-diethylamino-ξ-aminopentane in accordance with the directions given in Example 1. The ethereal solution of the 2-chloro-9-(α-diethylamino-ξ-pentylamino)-acridine formed is treated with an ethereal solution of citric acid. Thereby the yellow citrate is obtained which is readily soluble in water and sinters at about 65° C.

In the same manner as the citrate the very readily soluble acetate and lactate may be prepared.

*Example 3.*—22.8 grams of 2-methyl-9-chloroacridine are treated with 16 grams of α-diethylamino-delta-aminopentane in accordance with the directions given in Example 1. The 2-methyl-9-(α-diethylamino-delta-pentylamino)-acridine is obtained as dihydrochloride by the addition of an ethereal solution of hydrogen chloride to the ethereal solution of the base. It forms a yellow crystal powder which rapidly becomes moist when exposed to the air.

The 2-methyl-9-chloroacridine (forming yellowish needles when crystallized from benzene, melting at 123–124° C.) is obtained from the 4'-methyldiphenylamino-6-carboxylic acid (compare Ullmann and Bader, Annalen der Chemie 355, page 325) by subjecting it to ring closure and chlorination.

In an analogous manner the 2-ethyl-9-chloroacridine is obtained. When reacting upon the latter compound with α-diethylamino-delta-aminopentane in the above described manner the dihydrochloride of 2-ethyl-9-(α-diethylamino-delta-pentylamino)-acridine is obtained in the form of a yellow crystal powder.

*Example 4.*—29.3 grams of 2-bromo-9-chloroacridine are melted on the water-bath in 100 grams of crude cresol and heated with 16 grams of α-diethylamino-delta-aminopentane for one hour to 100° C. When working in the manner described in Example 1 the dihydrochloride of the 2-bromo-9-(α-diethylamino-delta-pentylamino)-acridine is obtained which after recrystallization from alcohol-ether decomposes at 148–150° C. (after previous sintering).

The 2-bromo-9-chloroacridine (forming weakly yellow needles from benzene melting at 136° C. is obtained from 4'-bromodiphenylamine-6-carboxylic acid (compare Ullmann and Tedesco, Annalen der Chemie 355, page 341) by chlorinating agents.

When using instead of the 2-bromo-9-chloroacridine 32.0 grams of 2-iodo-9-chloroacridine the dihydrochloride of the 2-iodo-9-(α-diethylamino-delta-pentylamino)-acridine is obtained which after recrystallization from alcohol-ether sinters at 140° C. and which gradually decomposes on further heating. The 2-iodo-9-chloroacridine (forming thin yellow crystals from benzene melting at 159–161° C.) is obtained from the 4'-iododiphenylamino-6-carboxylic acid (weakly yellow needles from alcohol melting at 200–201° C.) by means of chlorinating agents.

By means of 14.4 grams of α-diethylamino-γ-aminobutane the dihydrochloride of the 2-iodo-9-(α-diethylamino-γ-butylamino)-acridine is obtained which after recrystallization from alcohol-ether sinters at 135° C. and gradually decomposes on further heating.

By means of 21.9 grams of the triamine $$H_2N.CH_2.CHOH.CH_2.N(C_2H_5)—CH_2.CHOH.CH_2N(C_2H_5)_2$$

a 2-iodoacridine compound containing the radical of this base in the 9-position is obtained which forms a readily soluble yellow tartaric acid salt in alcoholic solution after the addition of an alcoholic solution of tartaric acid.

We claim:—

1. Acridine compounds of the general formula:

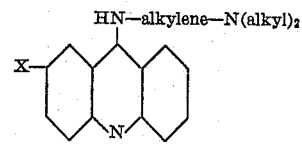

wherein X stands for a substituent selected from the group consisting of halogen atoms and alkyl groups, which compounds dissolve in the form of the free bases in organic solvents and dissolve in the form of their salts with acids in water.

2. Acridine compounds of the general formula:

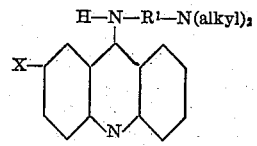

wherein $R^1$ stands for an aliphatic radical, X stands for a substituent selected from the group consisting of halogen atoms and alkyl groups, which compounds dissolve in the form of the free bases in organic solvents and dissolve in the form of their salts with acids in water.

3. 2-chloro-9-(α-diethylamino-delta-pentylamino)-acridine, which compound dissolves in the form of the free bases in organic solvents and dissolves in the form of its salts with acids in water.

4. 2-chloro-9-(α-diethylamino-delta-pentylamino)-acridine-dihydrochloride, forming a yellow, water-soluble powder, decomposing at 160–165° C.

5. Acridine compounds of the general formula:

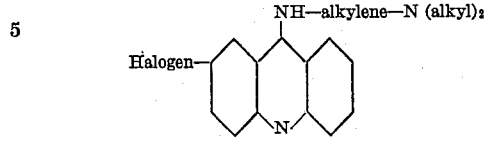

which compounds dissolve in the form of their free bases in organic solvents and in the form of their salts with acids in water.

6. An acridine compound of the formula

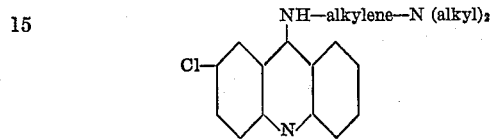

which compound dissolves in the form of its free base in organic solvents and in the form of its salts with acids in water.

7. Acridine compounds of the general formula:

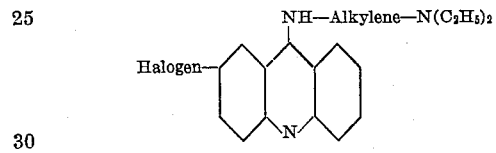

which compounds dissolve in the form of their free bases in organic solvents and in the form of their salts with acids in water.

8. An acridine compound of the formula:

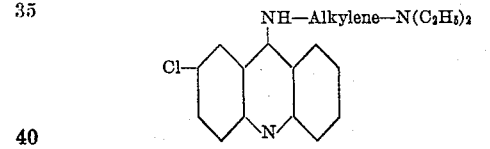

which compound dissolves in the form of its free base in organic solvents and in the form of its salts with acids in water.

9. Acridine compounds of the general formula:

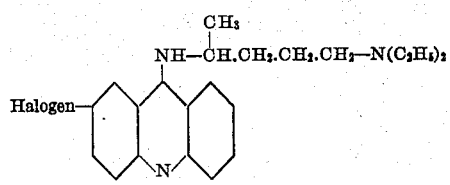

which compounds dissolve in the form of their free bases in organic solvents and in the form of their salts with acids in water.

10. An acridine compound of the formula:

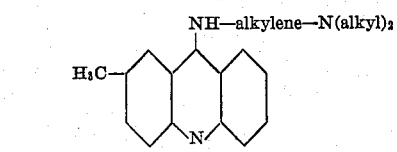

which compound dissolves in the form of its free base in organic solvents and in the form of its salts with acids in water.

11. An acridine compound of the formula:

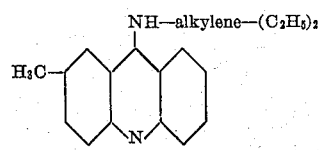

which compound dissolves in the form of its free base in the organic solvents and in the form of its salts with acids in water.

12. 2-methyl-9-(alpha-diethylamino-delta-pentylamino)-acridine, which compound dissolves in the form of the free bases in organic solvents and dissolves in the form of its salts with acids in water.

FRITZ MIETZSCH.
HANS MAUSS.